United States Patent
Sugiyama

(10) Patent No.: US 12,050,018 B2
(45) Date of Patent: Jul. 30, 2024

(54) AIR-CONDITIONING-APPARATUS SYSTEM INCLUDING MEMORY STORING TEMPERATURE INFORMATION AND PROCESSING CIRCUIT FORMING THERMAL IMAGE

(71) Applicant: Mitsubishi Electric Corporation, Tokyo (JP)

(72) Inventor: Daisuke Sugiyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 375 days.

(21) Appl. No.: 17/614,964

(22) PCT Filed: Aug. 23, 2019

(86) PCT No.: PCT/JP2019/033166
§ 371 (c)(1),
(2) Date: Nov. 29, 2021

(87) PCT Pub. No.: WO2021/038663
PCT Pub. Date: Mar. 4, 2021

(65) Prior Publication Data
US 2022/0235958 A1    Jul. 28, 2022

(51) Int. Cl.
*F24F 11/63* (2018.01)
*G05B 19/042* (2006.01)

(52) U.S. Cl.
CPC ............ *F24F 11/63* (2018.01); *G05B 19/042* (2013.01); *G05B 2219/2614* (2013.01)

(58) Field of Classification Search
CPC .. F24F 11/63; F24F 11/56; F24F 11/64; F24F 11/523; F24F 11/30; G05B 19/042;
(Continued)

(56) References Cited

U.S. PATENT DOCUMENTS

2012/0281098 A1* 11/2012 Wagner .................. H04N 25/48
348/E5.09
2015/0204556 A1    7/2015 Kusukame et al.
(Continued)

FOREIGN PATENT DOCUMENTS

CN     104471362 A    3/2015
EP     2733430 A2 *   5/2014 ............ F24F 1/0007
(Continued)

OTHER PUBLICATIONS

Office Action dated Nov. 29, 2023 issued in corresponding CN Patent Application No. 201980099482.1 (and English machine translation).
(Continued)

*Primary Examiner* — Alicia M. Choi
(74) *Attorney, Agent, or Firm* — Posz Law Group, PLC

(57) ABSTRACT

An air-conditioning-apparatus system includes an air-conditioning apparatus and a remote-operation centralized control apparatus connected with the air-conditioning apparatus via a network. The air-conditioning apparatus includes an infrared sensor and a drive control unit. The infrared sensor includes a drive actuator and is capable of acquiring temperature information on a location of one part of a room. The drive control unit controls the drive actuator to acquire temperature information on a plurality of locations in the room. The air-conditioning apparatus or the remote-operation centralized control apparatus includes: a storage unit that stores the temperature information on the locations in the room that is acquired by the infrared sensor under a control by the drive control unit; and a thermal image forming unit that forms a thermal image of the room based on the temperature information on the locations in the room that is stored in the storage unit.

9 Claims, 14 Drawing Sheets

(58) Field of Classification Search
CPC ..... G05B 2219/2614; H04N 5/33; G01J 5/48; G01J 5/00; G08B 17/125; A61B 5/01
See application file for complete search history.

(56) References Cited

U.S. PATENT DOCUMENTS

| | | | |
|---|---|---|---|
| 2015/0247647 A1 | 9/2015 | Kusukame et al. | |
| 2015/0350571 A1* | 12/2015 | Wang | H04N 5/33 348/164 |
| 2016/0005156 A1* | 1/2016 | Wang | G06F 18/24 348/94 |
| 2016/0202678 A1* | 7/2016 | Aggarwal | H04N 23/11 700/275 |
| 2018/0187910 A1 | 7/2018 | Kusukame et al. | |
| 2019/0032950 A1* | 1/2019 | Nakamura | F24D 3/14 |
| 2019/0219297 A1* | 7/2019 | Annaamalai | F24F 11/64 |
| 2020/0224906 A1* | 7/2020 | Kusukame | G01J 5/0025 |
| 2021/0033471 A1* | 2/2021 | Nakamura | G01J 5/605 |

FOREIGN PATENT DOCUMENTS

| | | |
|---|---|---|
| JP | H09-178566 A | 7/1997 |
| JP | 2007155180 A | 6/2007 |
| JP | 2015-197241 A | 11/2015 |
| JP | 2015-222260 A | 12/2015 |
| JP | 2016-065848 A | 4/2016 |
| JP | 2018-055205 A | 4/2018 |
| WO | 2014185033 A1 | 11/2014 |
| WO | 2016135804 A1 | 9/2016 |

OTHER PUBLICATIONS

International Search Report dated Nov. 5, 2019, issued in corresponding International Application No. PCT/JP2019/033166 (and English Machine Translation).

Office Action dated Feb. 13, 2023 issued in corresponding CN Patent Application No. 201980099482.1 (and English machine translation).

Office Action dated Jul. 27, 2023 issued in corresponding CN patent application No. 201980099482.1 (and Machine translation).

Office Action dated Aug. 30, 2022 issued in corresponding JP Patent Application No. 2021-541794 (and English translation).

* cited by examiner (A) INITIAL POSITION (B1) DRIVEN ONCE FROM START POSITION (B2) DURING DRIVING (C) END POSITION

AIR-CONDITIONING-APPARATUS SYSTEM INCLUDING MEMORY STORING TEMPERATURE INFORMATION AND PROCESSING CIRCUIT FORMING THERMAL IMAGE

CROSS REFERENCE TO RELATED APPLICATION

This application is a U.S. National Stage Application of International Application No. PCT/JP2019/033166, filed on Aug. 23, 2019, the contents of which are incorporated herein by reference.

TECHNICAL FIELD

The present disclosure relates to an air-conditioning-apparatus system that can cause an operation terminal to display a thermal image.

BACKGROUND ART

In a weft-known air-conditioning apparatus, the temperature of a location that is to be measured is measured in a non-contact manner with an infrared sensor or other devices to acquire temperature information, and the acquired temperature information is transmitted to an image display device via a network. The image display device displays a thermal image based on the temperature information transmitted from the air-conditioning apparatus.

CITATION LIST

Patent Literature

Patent Literature 1: Japanese Unexamined Patent Application Publication No. 2016-65848

SUMMARY OF INVENTION

Technical Problem

However, in order to display a wide-angle thermal image of the entire room with the infrared sensor mounted on the air-conditioning apparatus, it is necessary to increase the number of pixels of the infrared sensor to several hundreds of thousands of pixels, and it is also necessary to arrange a large number of elements of the sensor.

Accordingly, it is necessary to make a larger infrared sensor and a larger housing of an air-conditioning apparatus. Consequently, the cost of the infrared sensor is increased. Therefore, in the case of using an infrared sensor generally used in the air-conditioning apparatus and having several tens to several hundreds of pixels, it is not possible to display a thermal image of the entire room for a user.

The present disclosure is applied in view of the above circumstances, and relates to an air-conditioning-apparatus system that can cause a thermal image of the entire room to be displayed on an operation terminal via a network even with an infrared sensor having the small number of pixels to acquire temperature information.

Solution to Problem

An air-conditioning-apparatus system according to an embodiment of the present disclosure includes: an air-conditioning apparatus including an infrared sensor and a drive control unit, the infrared sensor including a drive actuator and being capable of acquiring temperature information on a location of one part of a room, the drive control unit being configured to control the drive actuator of the infrared sensor to acquire temperature information on a plurality of locations in the room; and a remote-operation centralized control apparatus connected with the air-conditioning apparatus via a network. The air-conditioning apparatus or the remote-operation centralized control apparatus includes: a storage unit configured to store the temperature information on the plurality of locations in the room that is acquired by the infrared sensor under a control by the drive control unit; and a thermal image forming unit configured to form a thermal image of the room based on the temperature information on the plurality of locations in the room that is stored in the storage unit.

Advantageous Effects of Invention

In the air-conditioning-apparatus system according to the embodiment of the present disclosure, the thermal image forming unit forms thermal images of the plurality of locations in the room based on temperature information on the plurality of locations in the room that is stored in the storage unit, and transmits the thermal images. By virtue of such a configuration, even when an infrared sensor having a small number of pixels is used, a thermal image of the entire room can be displayed on the operation terminal.

Furthermore, according to the embodiment of the present disclosure, a wide-angle thermal image can be formed based on a combination of a plurality of pieces of temperature information acquired by the infrared sensor having the small number of pixels. Therefore, it is not necessary to increase the number of pixels of the infrared sensor to a larger number. Accordingly, it is not necessary to increase the size of the housing of the air-conditioning apparatus or adopt an expensive infrared sensor.

DESCRIPTION OF EMBODIMENTS

An air-conditioning-apparatus system according to each of embodiments will be described with reference to drawings. It should be noted that in each of figures to be referred to below, components that are the same as those in a previous figure or previous figures are denoted by the same reference signs, and their descriptions will thus be omitted, except for the case where it is necessary to re-describe such a component or components.

Embodiment 1

Figure 1:
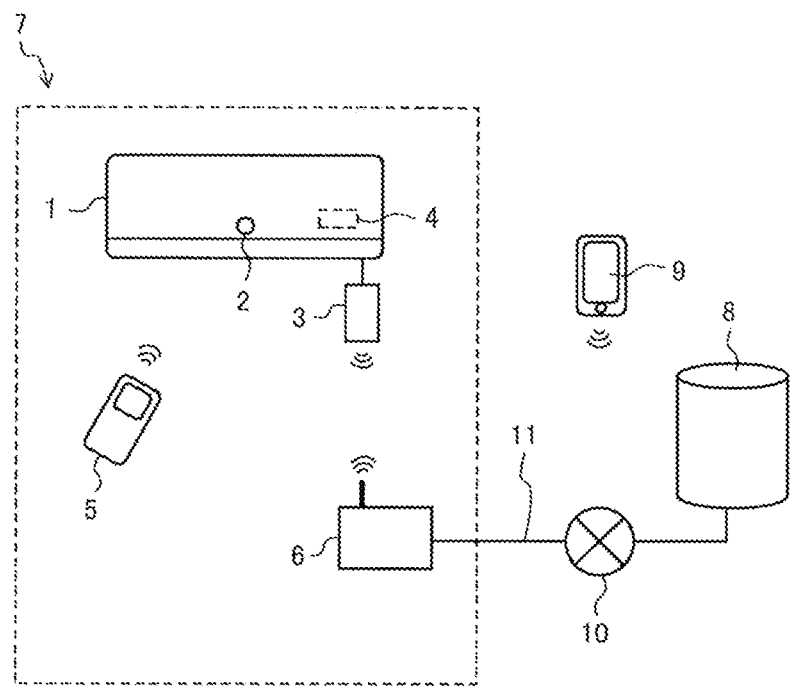
FIG. 1 illustrates an air-conditioning-apparatus system according to Embodiment 1.

FIG. 1 illustrates an air-conditioning-apparatus system according to Embodiment 1.

As illustrated in FIG. 1, an air-conditioning apparatus 1 is installed in a room 7 of a residence, for example. The air-conditioning apparatus 1 is operated based on remote control information from a remote control device 5 that is provided as an attachment to the air-conditioning apparatus 1.

An infrared sensor 2 is attached to the air-conditioning apparatus 1. The infrared sensor 2 achieves light distribution of infrared rays in the room 7. In the infrared sensor 2, a plurality of elements that acquire temperature information are arranged in a height direction and a lateral direction of the infrared sensor 2. For example, 60 elements are arranged in the height direction, and 10 elements are arranged in the lateral direction, that is, 600 elements are arranged in total.

The infrared sensor 2 cannot acquire temperature information on the entire range of the room 7, but can acquire temperature information on a certain range of the room 7 at a time. The infrared sensor 2 includes a drive actuator 2a (see FIG. 2, which will be described later), and can be driven by the drive actuator 2a. For example, when the infrared sensor 2 is driven to be rotated to the left and the right, a light distribution range of the infrared sensor 2 varies in the lateral direction. As a result, it is possible to acquire temperature information on a plurality of locations in the room 7. Furthermore, a display portion 4 is provided at a front surface of the air-conditioning apparatus 1, and a display on the display portion 4 varies depending on an operation of the air-conditioning apparatus 1. The display portion 4 includes a lamp that indicates that a thermal image is in a transmissible state.

Also, an adaptor 3 is attached to the air-conditioning apparatus 1 to transmit and receive remote information that is different from the remote control information. In the room 7, a router 6 is installed in the room 7 in addition to the air-conditioning apparatus 1. The router 6 transmits information received via an external network 11 to the adaptor 3, or transmits information received from the adaptor 3 to the external network 11. Referring to FIG. 1 the adaptor 3 is provided outside the air-conditioning apparatus 1; however, the adaptor 3 may be provided in the air-conditioning apparatus 1.

An internet network 10 is connected to the external network 11. A remote-operation centralized control apparatus 8, such as a server, is connected to the internet network 10. An operation terminal 9 gives an operation instruction to the air-conditioning apparatus 1. From the outside of the room 7, for example, when an operation instruction is given to the air-conditioning apparatus 1 using the operation terminal 9, the operation instruction is transmitted to the remote-operation centralized control apparatus 8 via the internet network 10.

Thereafter, remote information is transmitted and received between the remote-operation centralized control apparatus 8 and the adaptor 3 via the internet network 10, the external network 11, and the router 6. That is, the operation instruction given by the operation terminal 9 is transmitted from the remote-operation centralized control apparatus 8 to the air-conditioning apparatus 1 via the internet network 10, the external network 11, and the router 6.

Figure 2:
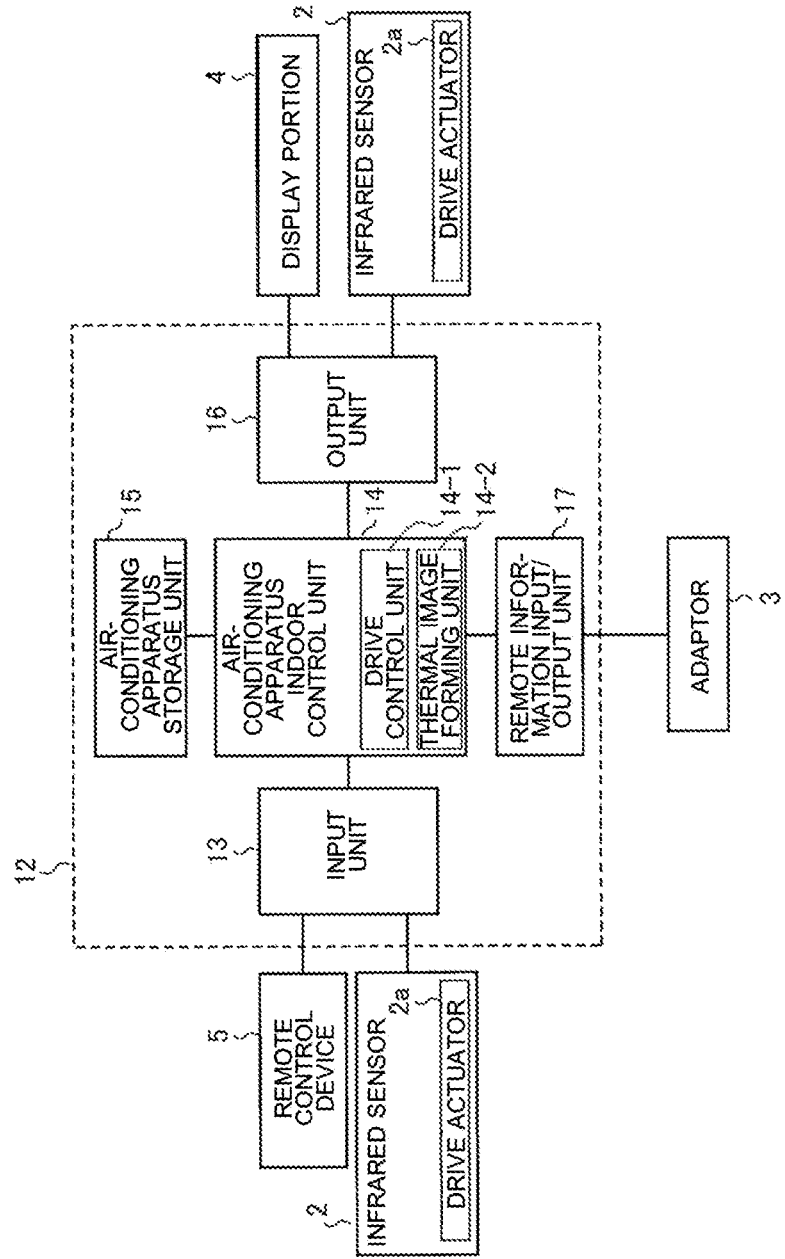
FIG. 2 is a function block diagram of a controller of an air-conditioning apparatus of the air-conditioning-apparatus system according to Embodiment 1.

FIG. 2 is a function block diagram of a controller 12 of the air-conditioning apparatus 1 of the air-conditioning-apparatus system according to Embodiment 1.

The air-conditioning apparatus 1 includes the controller 12. The controller 12 includes an input unit 13, an air-conditioning-apparatus indoor control unit 14, an air-conditioning-apparatus storage unit 15, an output unit 16, and a remote information input/output unit 17.

The input unit 13 processes, as input information, a signal regarding operation information set by a user with the remote control device 5 and a signal regarding temperature information from the infrared sensor 2.

The air-conditioning-apparatus indoor control unit 14 stores information input from the input unit 13 in the air-conditioning-apparatus storage unit 15. Furthermore, the air-conditioning-apparatus indoor control unit 14 also stores remote information input from the remote information input/output unit 17 in the air-conditioning-apparatus storage unit 15, and outputs remote information that is to be output to the external network 11 to the remote information input/output unit 17.

The air-conditioning-apparatus indoor control unit 14 performs an arithmetic determination process based on information, such as setting information stored in the air-conditioning-apparatus storage unit 15 and set in advance, the input information input from the input unit 13 and the remote information input from the remote information input/output unit 17. The result of the arithmetic determination process is stored in the air-conditioning-apparatus storage unit 15 as output information, and is output to the output unit 16.

The air-conditioning-apparatus indoor control unit 14 includes a drive control unit 14-1 and a thermal image forming unit 14-2.

The drive control unit 14-1 controls the drive actuator 2a of the infrared sensor 2 to acquire temperature information on a plurality of locations in the room 7. Based on the temperature information on the plurality of locations in the room 7 that is stored in the air-conditioning-apparatus storage unit 15, the thermal image forming unit 14-2 forms thermal images of the plurality of locations. Based on output information from the air-conditioning-apparatus indoor control unit 14, the output unit 16 turns on or off the display portion 4 and controls the drive actuator 2a of the infrared sensor 2.

The remote information input/output unit 17 receives the remote information from the adaptor 3 that receives the remote information from the remote-operation centralized control apparatus 8, and outputs the remote information to the air-conditioning-apparatus indoor control unit 14. The remote information input/output unit 17 receives output information that corresponds to the result of the arithmetic determination processing from the air-conditioning-apparatus indoor control unit 14. Then, the remote information input/output unit 17 outputs the received output information to the adaptor 3. The output information output to the adaptor 3 is transmitted to the remote-operation centralized control apparatus 8 via the router 6 and the external network 11.

The controller 12 is dedicated hardware or a central processing device (also referred to as a CPU, a processing device, an arithmetic device, a microprocessor, a microcomputer, or a processor) that executes a program stored in a memory.

In the case where the controller 12 is dedicated hardware, for example, the controller 12 corresponds to a single circuit, a composite circuit, an application specific integrated circuit (ASIC), a field programmable gate array (FPGA), or a combination of these circuits. The function units that are implemented by the controller 12 may be implemented by respective hardware or single hardware.

In the case where the controller 12 is a CPU, functions that are fulfilled by the controller 12 are fulfilled by software, firmware, or a combination of the software and the firmware. The software or the firmware is described as a program, and is stored in the memory. The CPU reads and executes the program stored in the memory to fulfill each of the functions of the controller 12. The memory is, for example, a nonvolatile or volatile semiconductor memory, such as a RAM, a ROM, a flash memory, an EPROM, or an EEPROM.

Some of the functions of the controller 12 may be fulfilled by dedicated hardware, and some of the functions of the controller 12 may be fulfilled by software or firmware.

Figure 3:
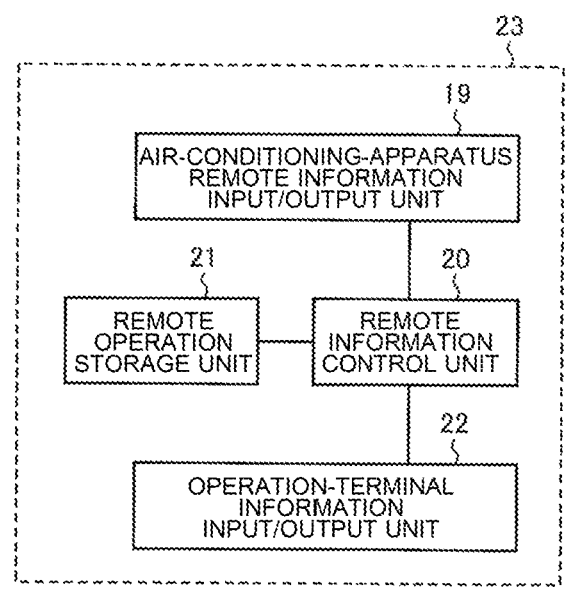
FIG. 3 is a function block diagram of a controller of a remote-operation centralized control apparatus of the air-conditioning-apparatus system according to Embodiment 1.

FIG. 3 is a function block diagram of a controller 23 of the remote-operation centralized control apparatus 8 of the air-conditioning-apparatus system according to Embodiment 1. The remote-operation centralized control apparatus 8 includes the controller 23. The controller 23 of the remote-operation centralized control apparatus 8 includes an air-conditioning-apparatus remote information input/output unit 19, a remote information control unit 20, a remote operation storage unit 21, and an operation-terminal information input/output unit 22.

The air-conditioning-apparatus remote information input/output unit 19 processes as input information, remote information from the air-conditioning apparatus 1, and outputs the input information to the remote information control unit 20. The air-conditioning-apparatus remote information input/output unit 19 also processes as output information, operation information on the operation terminal 9 from the air-conditioning-apparatus remote information input/output unit 19, and transmits the output information to the air-conditioning apparatus 1.

The remote information control unit 20 stores the input information input by the air-conditioning-apparatus remote information input/output unit 19 in the remote operation storage unit 21. The remote information control unit 20 performs an arithmetic determination process based on the input information stored in the remote operation storage unit 21, setting information set in advance, the program, etc. The result of the arithmetic determination process is stored as output information in the remote operation storage unit 21. The remote information control unit 20 outputs the result of the arithmetic determination process to the operation-terminal information input/output unit 22.

The operation-terminal information input/output unit 22 receives a request for operation information and display content information from the operation terminal 9, and outputs the request to the remote information control unit 20 as input information. The operation-terminal information input/output unit 22 processes a request for display information from the remote information control unit 20 as output information. The operation-terminal information input/output unit 22 transmits information to the operation terminal 9. The transmitted information is displayed on a screen of the operation terminal 9.

Regarding Embodiment 1, the air-conditioning-apparatus storage unit 15 will also be referred to as "storage unit", and the remote information input/output unit 17 will also be referred to as "transmission unit".

Figure 4:
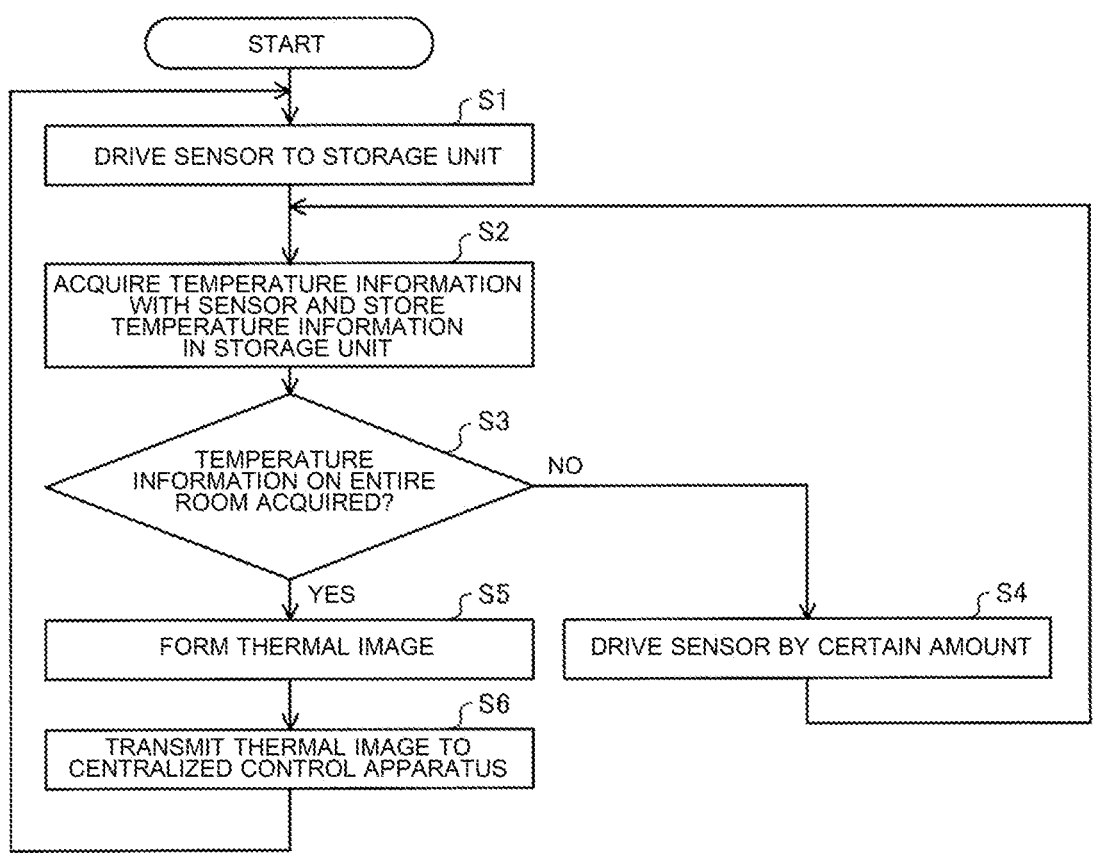
FIG. 4 is a flowchart illustrating an operation of the air-conditioning-apparatus system according to Embodiment 1.
Figure 5:
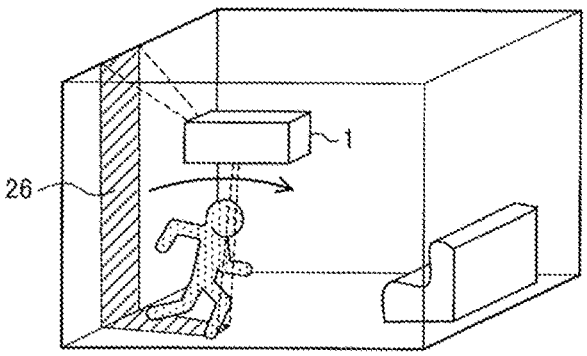
FIG. 5 indicates, in a room, shifts of a light distribution range of an infrared sensor of the air-conditioning apparatus of the air-conditioning-apparatus system according to Embodiment 1.
Figure 5:
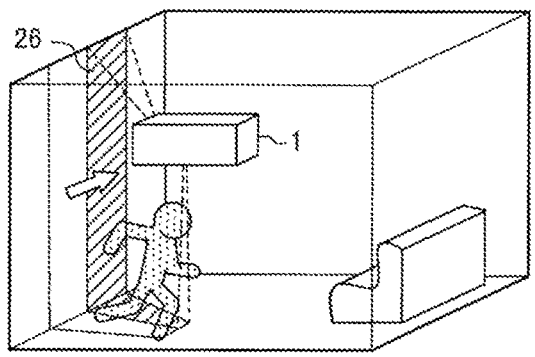
Figure 5:
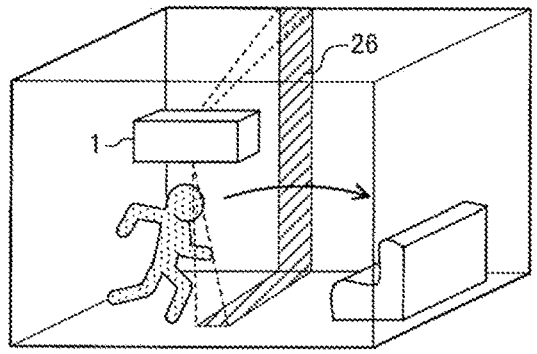
Figure 5:
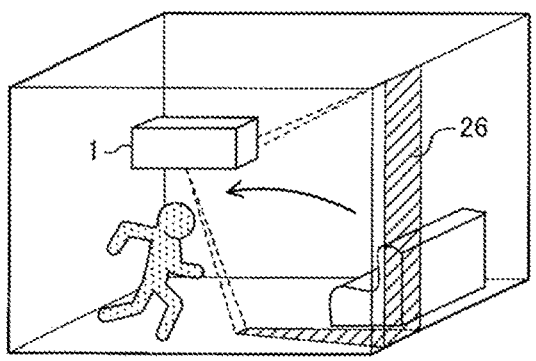

Next, it will be described how the air-conditioning-apparatus system according to Embodiment 1 is operated. FIG. 4 is a flowchart indicating an operation of the air-conditioning-apparatus system according to Embodiment 1. FIG. 5 indicates in the room 7, shifts of a light distribution range 26 of the infrared sensor 2 of the air-conditioning apparatus 1 of the air-conditioning-apparatus system according to Embodiment 1. In FIG. 5, a hatched area is the light distribution range 26 in which the infrared sensor 2 can acquire temperature information. Also, in FIG. 5, a white arrow indicates a direction in which the infrared sensor 2 is moved when the infrared sensor 2 is driven as first driving from a start position thereof, and a black arrow indicates a direction in which the infrared sensor 2 is driven.

As indicated in FIG. 4, in the case of displaying a thermal image on the operation terminal 9, first, the air-conditioning-apparatus indoor control unit 14 drives the infrared sensor 2 to set the light distribution range 26 of the infrared sensor 2 to an initial position (S1). FIG. 5, (A), is a diagram illustrating a state where the light distribution range 26 of the infrared sensor 2 is set to the initial position. To set the light distribution range 26 of the infrared sensor 2 to the initial position, the infrared sensor 2 is driven and rotated until the light distribution range is located such that the infrared sensor 2 can acquire temperature information on the leftmost position of the room 7, for example. The leftmost position is a position corresponding to the maximum value in a range where the light distribution range of the infrared sensor 2 does not reach the air-conditioning apparatus 1. The amount of driving of the infrared sensor 2 that is driven to such a position is stored in advance in the air-conditioning-apparatus storage unit 15. The infrared sensor 2 is driven and rotated based on the amount of driving that is stored as described above.

Next, the air-conditioning-apparatus indoor control unit 14 acquires temperature information from the infrared sensor 2 (S2), and stores the acquired temperature information in the air-conditioning-apparatus storage unit 15. Then, the air-conditioning-apparatus indoor control unit 14 determines whether temperature information on the entire room 7 is acquired or not (S3).

In the case where the above rotational driving is started, with the initial position set to the leftmost position, in step S3, whether temperature information on the entire room is acquired or not is determined based on whether the infrared sensor 2 is rotated until the light distribution range is located such that temperature information on the rightmost position of the room 7 can be acquired by measurement, as illustrated in FIG. 5, (C), for example. The rightmost position is a position corresponding to the maximum value in a range where the light distribution range of the infrared sensor 2 does not cover the air-conditioning apparatus 1, and the amount of driving or the number of times at which driving of the infrared sensor 2 is performed is stored in advance in the remote operation storage unit 21, as in the initial position. Whether temperature information on the entire room is acquired or not is determined based on whether the light distribution range of the infrared sensor 2 reaches such a position, based on the number of driving or the number of times that is stored in the remote operation storage unit 21.

In step S3, when the air-conditioning-apparatus indoor control unit 14 determines that temperature information on the entire room 7 is not acquired (NO in S3), the air-conditioning-apparatus indoor control unit 14 drives and rotates the infrared sensor 2 rotate the infrared sensor 2 by a certain amount (S4). For example, as illustrated in FIG. 5, (B1), the infrared sensor 2 is rotated in such a manner as to prevent a gap from being provided between a light distribution range of the infrared sensor 2 that is obtained at a previous time and a light distribution range of the infrared sensor 2 that is achieved at this time. The amount of rotational driving that is performed once is stored in advance in the air-conditioning-apparatus storage unit 15. After the infrared sensor 2 is driven, the processing returns to step S2, and the air-conditioning-apparatus indoor control unit 14 re-acquires temperature information and re-stores the acquired temperature information in the remote operation storage unit 21.

Thereafter, until temperature information on the entire room 7 is acquired in step 33, the acquisition of temperature information and the storage of the temperature information in the remote operation storage unit 21 are repeated while driving the infrared sensor 2 to rotate the infrared sensor 2 from the left to the right as illustrated in (B2) in FIG. 5.

In contrast, in step S3, when determining that temperature information on the entire room 7 is acquired (YES in S3), the air-conditioning-apparatus indoor control unit 14 forms a single thermal image based on a combination of a plurality of pieces of temperature information on the respective locations that are stored in the remote operation storage unit 21 (S5).

The air-conditioning-apparatus indoor control unit 14 transmits the thermal image formed in step S5 to the remote-operation centralized control apparatus 8 via the adaptor 3, the router 6, and the Internet network 10 in this order (36). The thermal image transmitted by the air-conditioning-apparatus indoor control unit 14 is stored in the remote operation storage unit 21.

Thereafter, the air-conditioning-apparatus indoor control unit 14 drives and moves the infrared sensor 2 to an initial position for the infrared sensor 2 in order to re-acquire temperature information in S1. In Embodiment 1, after the thermal image is transmitted in step S6, the air-conditioning-apparatus indoor control unit 14 returns the sensor to the initial position in step S1.

In Embodiment 1, the air-conditioning-apparatus indoor control unit 14 rotates the infrared sensor 2 from an extreme left indicated in (A) in FIG. 5 to an extreme right indicated in (C) in FIG. 5, and re-returns the infrared sensor 2 to the extreme left. This, however, is not limiting. After the infrared sensor 2 reaches the extreme right and a thermal image is transmitted, the air-conditioning-apparatus indoor control unit 14 may acquire temperature information by rotating the infrared sensor 2 from the extreme right toward the extreme left by a fixed amount in each step.

Figure 6:
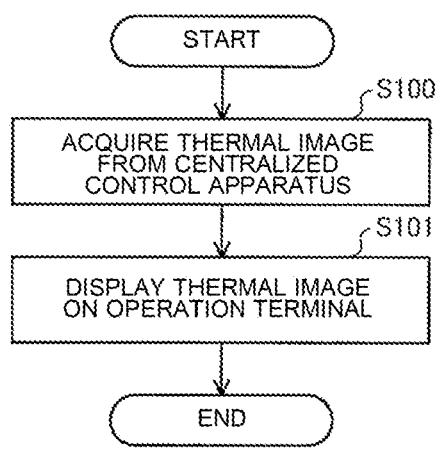
FIG. 6 is a flowchart indicating an operation of an operation terminal of the air-conditioning-apparatus system according to Embodiment 1.

FIG. 6 is a flowchart indicating an operation of the operation terminal 9 of the air-conditioning-apparatus system according to Embodiment 1.

When an operation to acquire a thermal image is performed, the operation terminal 9 acquires the thermal image stored in the remote operation storage unit 21 via the internet network 10 (S100).

Figure 7:
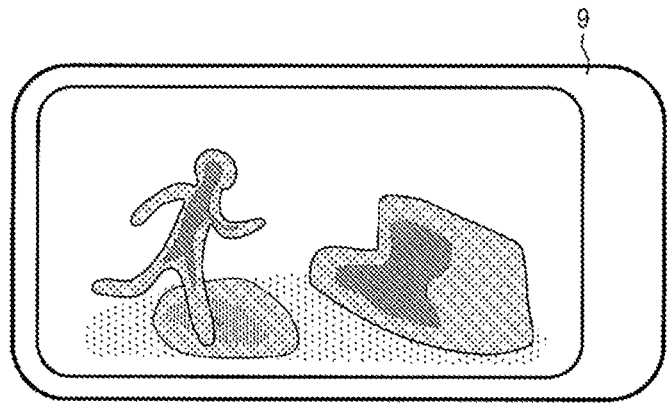
FIG. 7 illustrates a thermal image displayed on the operation terminal of the air-conditioning-apparatus system according to Embodiment 1.

The operation terminal 9 receives the thermal image transmitted in step S100, and displays the received thermal image (S101). FIG. 7 illustrates the thermal image displayed on the operation terminal 9 of the air-conditioning-apparatus system according to Embodiment 1.

The remote-operation centralized control apparatus 8 may be configured to select any of a plurality of thermal images each of which is transmitted from the air-conditioning apparatus 1 and which are stored in the remote operation storage unit 21, when the operation to acquire a thermal image is performed by a user with the operation terminal 9.

Therefore, in the air-conditioning-apparatus system according to Embodiment 1, a wide-angle thermal image can be formed based on a combination of a plurality of pieces of temperature information that are acquired by the infrared sensor 2, which has a small number of pixels that acquire temperature information. Therefore, a wide-angle thermal image can be acquired without increasing the number of pixels of the infrared sensor 2 to a large number of pixels. Therefore, it is not necessary to increase the size of the housing of the air-conditioning apparatus 1 or adopt an expensive infrared sensor 2.

Embodiment 2

In Embodiment 1, a thermal image is formed by the air-conditioning apparatus 1 on the basis of acquired temperature information. In Embodiment 2, it will be described how a thermal image is formed by the remote-operation centralized control apparatus 8. Specifically, in Embodiment 2, the remote information control unit 20 of the remote-operation centralized control apparatus 8 has the function of the thermal image forming unit 14-2 of the air-conditioning-apparatus indoor control unit 14.

Figure 8:
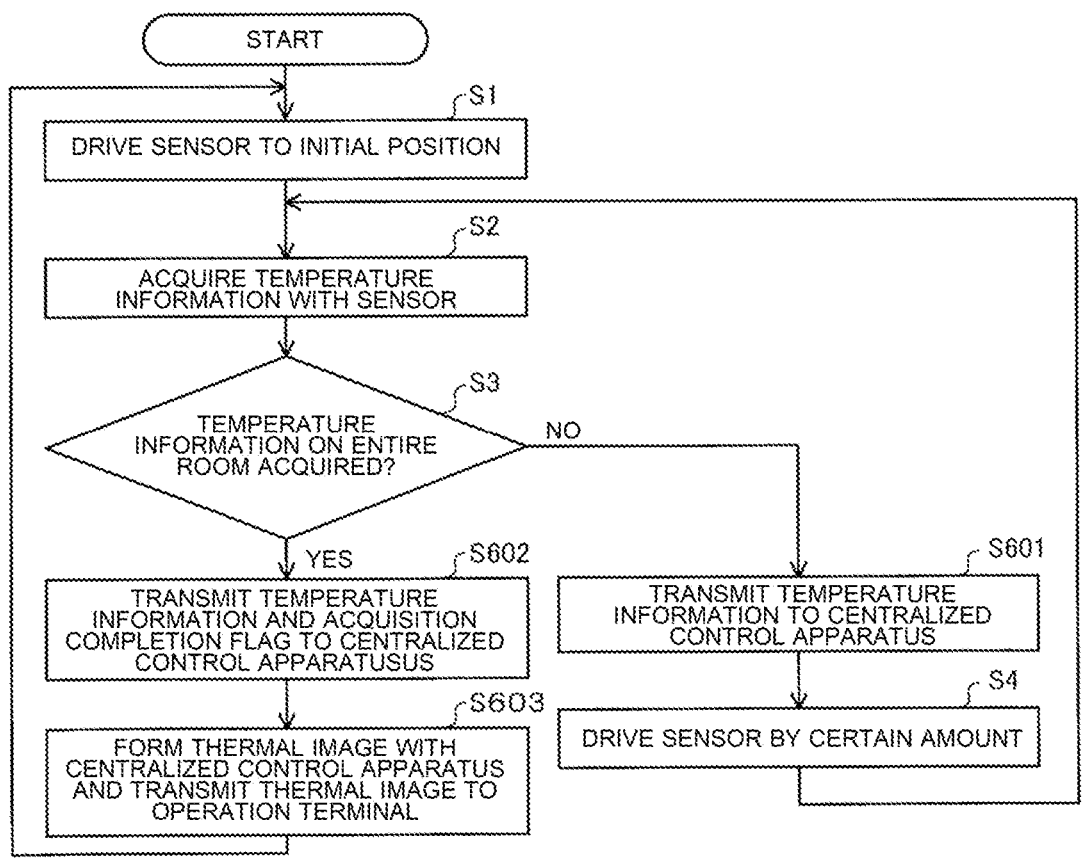
FIG. 8 is a flowchart indicating an operation of an air-conditioning-apparatus system according to Embodiment 2.

FIG. 8 is a flowchart indicating an operation of an air-conditioning-apparatus system according to Embodiment 2. Regarding Embodiment 2, components that are the same as those in Embodiment 1 will be denoted by the same reference signs, and their descriptions will thus be omitted. Embodiment 2 will be described by referring mainly to the differences between Embodiments 1 and 2.

In Embodiment 2, in the case of displaying a thermal image on the operation terminal 9, first, the air-conditioning-apparatus indoor control unit 14 of the air-conditioning apparatus 1 drives and moves the infrared sensor 2 to the initial position for the infrared sensor 2 and to set the light distribution range 26 of the infrared sensor 2 to the initial position for light distribution (S1).

Next, the air-conditioning-apparatus indoor control unit 14 acquires temperature information from the infrared sensor 2 (S2). The air-conditioning-apparatus indoor control unit 14 stores the acquired temperature information in the air-conditioning-apparatus storage unit 15. Then, the air-conditioning-apparatus indoor control unit 14 determines whether temperature information on the entire room 7 is acquired or not (S3).

In step S3, when determining in step S3 that temperature information on the entire room 7 is not acquired (NO in S3), the air-conditioning-apparatus indoor control unit 14 transmits temperature information acquired in step S2 to the remote-operation centralized control apparatus 8 via the adaptor 3, the router 6, and the internee network 10 in this order (S601). The remote information control unit 20 of the remote-operation centralized control apparatus 8 receives the transmitted temperature information, and stores the received temperature information in the remote operation storage unit 21.

Thereafter, as in Embodiment 1, the infrared sensor 2 is driven by a certain amount until temperature information on the entire room 7 is acquired (S4), and the acquisition of temperature information and the transmission of the temperature information to the remote-operation centralized control apparatus 8 are repeated.

In step 33, when determining that the acquisition of temperature information on the entire room 7 is completed (YES in S3), the air-conditioning-apparatus indoor control unit 14 transmits the temperature information along with an acquisition completion flag indicating the completion of the acquisition of temperature information on the entire room 7 to the remote-operation centralized control apparatus 8 (S602). When receiving the acquisition completion flag, the remote-operation centralized control apparatus 8 can recognize reception of all the temperature information on the entire room 7.

The remote information control unit 20 of the remote-operation centralized control apparatus 8 forms a thermal image based on the temperature information stored in the remote operation storage unit 21, and transmits the thermal image to the operation terminal 9 (3603). In the case of forming a new thermal image, the processing returns to step S1.

Therefore, in the air-conditioning-apparatus system according to Embodiment 2, since the remote-operation centralized control apparatus 8 performs processing of forming a thermal image, the air-conditioning apparatus 1 does not perform complicated image processing. Therefore, it is possible to reduce the storage area of the air-conditioning apparatus 1, that is, it is possible to obtain this advantage in addition to the advantages obtained by the air-conditioning-apparatus system of Embodiment 1.

Embodiment 3

In Embodiment 1, a thermal image is displayed on the operation terminal 9 without any change. Temperature information is acquired a number of times, and thus in some cases, a long time is required to form a single thermal image. In Embodiment 3, the user can grasp time at which a thermal image is formed. Regarding Embodiment 3, components that are the same as those in Embodiment 1 will be denoted by the same reference signs, and their descriptions will thus be omitted. Embodiment 3 will be described by referring mainly to the differences between Embodiments 1 and 3.

Figure 9:
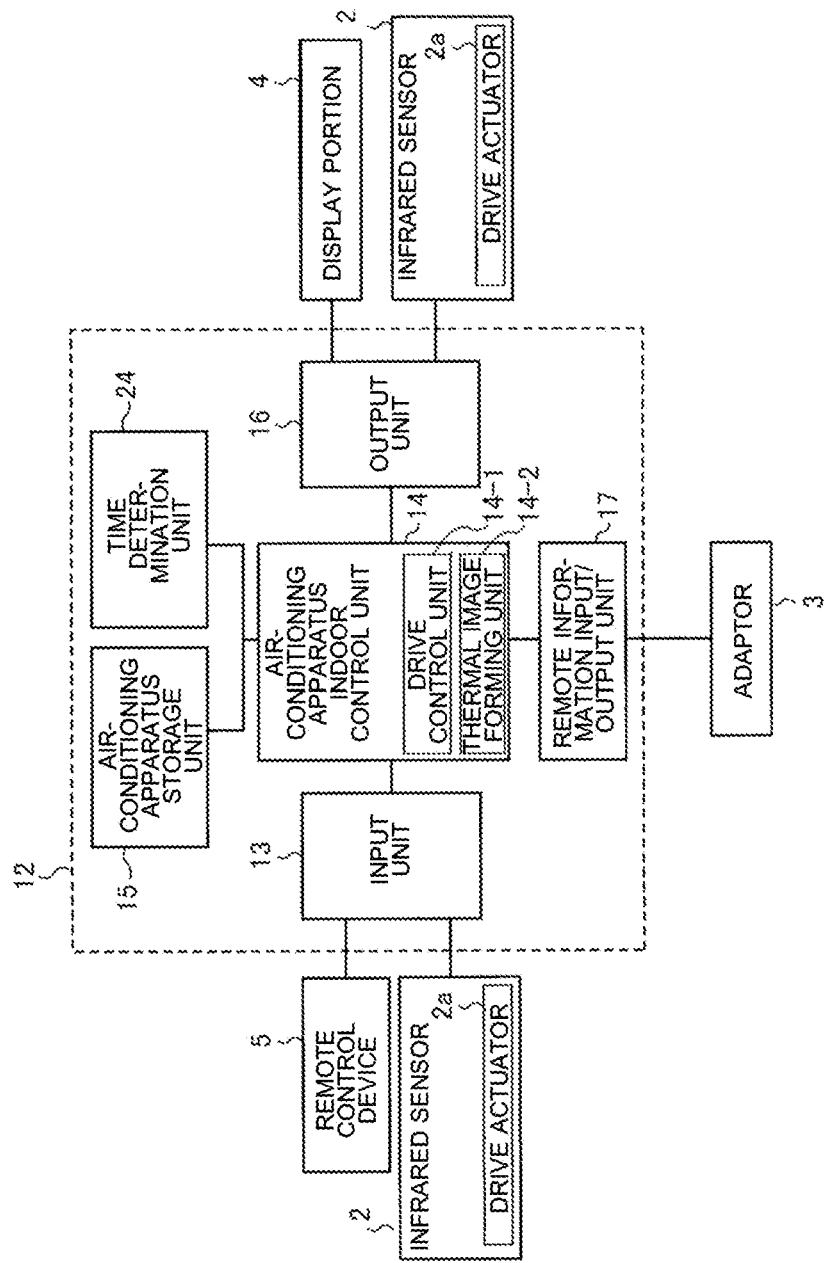
FIG. 9 is a function block diagram of a controller of an air-conditioning apparatus of an air-conditioning-apparatus system according to Embodiment 3.

FIG. 9 is a function block diagram of the controller 12 of the air-conditioning apparatus 1 of an air-conditioning-apparatus system according to Embodiment 3.

In Embodiment 3, the controller 12 includes a time determination unit 24. The time determination unit 24 determines time information indicating the time at which a thermal image is formed by the thermal image forming unit 14-2, The air-conditioning-apparatus indoor control unit 14 stores the time information determined by the time determination unit 24 in the air-conditioning-apparatus storage unit 15.

The air-conditioning-apparatus storage unit 15 stores the formed thermal image and the determined time information in addition to temperature information and other information. The remote information input/output unit 17 transmits the thermal image and the time information to the remote-operation centralized control apparatus 8. The transmitted thermal image and time information are transmitted from the remote-operation centralized control apparatus 8 to the operation terminal 9, and are displayed on the operation terminal 9.

Figure 10:
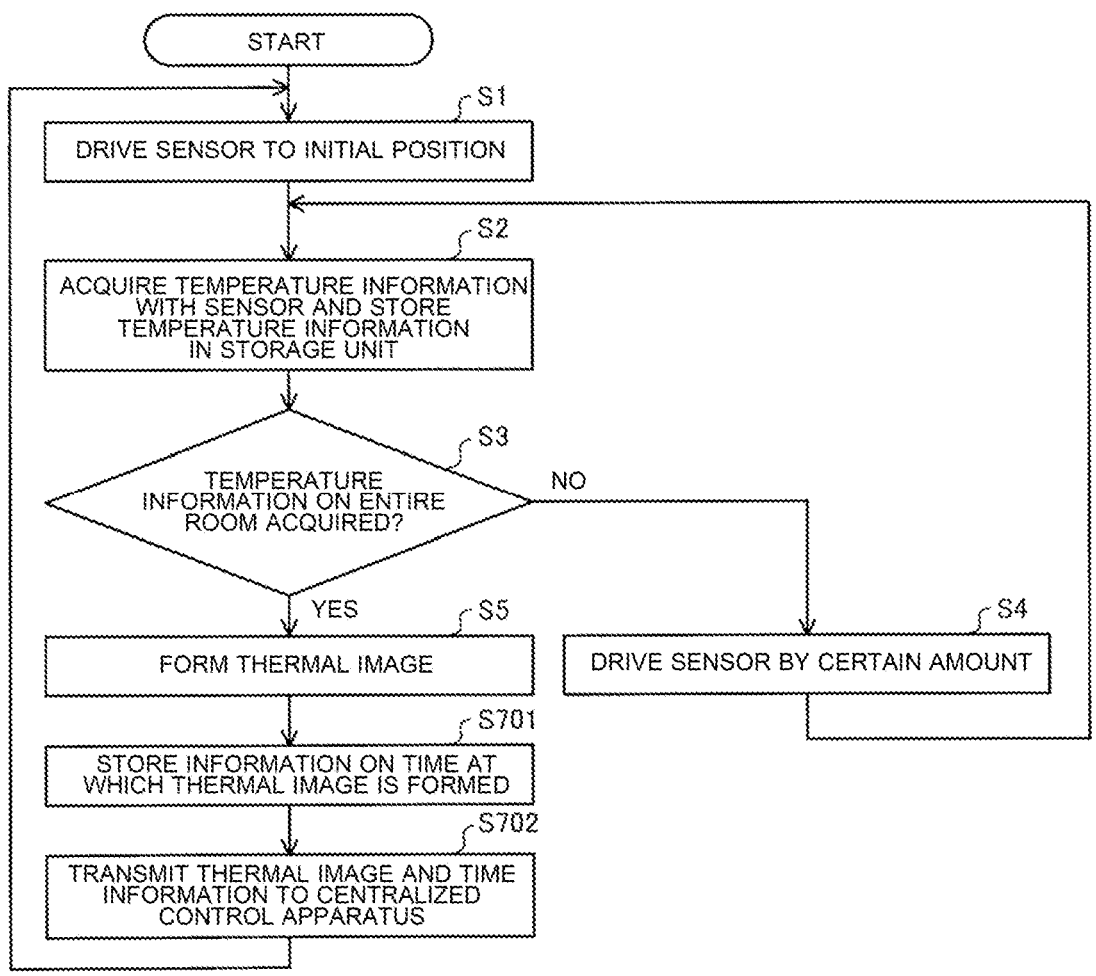
FIG. 10 is a flowchart indicating an operation of the air-conditioning-apparatus system according to Embodiment 3.

FIG. 10 is a flowchart indicating an operation of the air-conditioning-apparatus system according to Embodiment 3. The processes of steps S1 to S5 are substantially equal to processes indicated in the flowchart in FIG. 4 relating to Embodiment 1. After a thermal image is formed in step S5, the thermal image forming unit 14-2 stores, in the air-conditioning-apparatus storage unit 15, time information determined by the time determination unit 24 and indicating time at which the thermal image is formed (S701). Thereafter, the remote information input/output unit 17 transmits the thermal image and the time information to the remote-operation centralized control apparatus 8 (S702).

Figure 11:
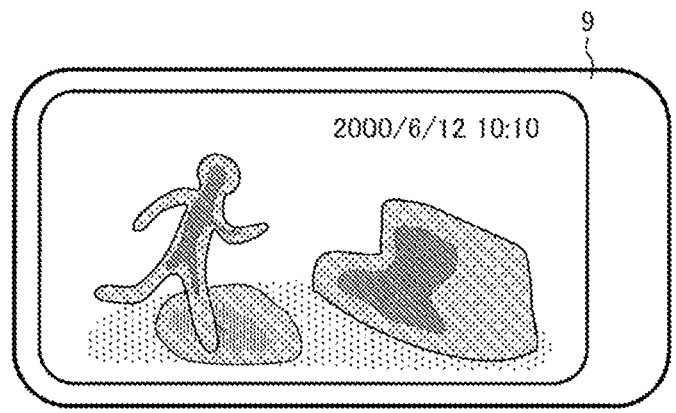
FIG. 11 illustrates an example of time information and a thermal image that are displayed at an operation terminal of the air-conditioning-apparatus system according to Embodiment 3.

Thereafter, when the operation to acquire a thermal image is performed with the operation terminal 9, the thermal image and the time information transmitted to the remote-operation centralized control apparatus 8 in step S702 are displayed on the operation terminal 9. FIG. 11 illustrates an example of time information and a thermal image that are displayed on the operation terminal 9 of the air-conditioning-apparatus system according to Embodiment 3.

In Embodiment 3, the air-conditioning apparatus 1 determines the time at which the thermal image is formed. However, as in Embodiment 2, temperature information may be transmitted from the air-conditioning apparatus 1 to the remote-operation centralized control apparatus 8, each time a thermal image and time information are required to be formed by the remote-operation centralized control apparatus 8.

Figure 12:
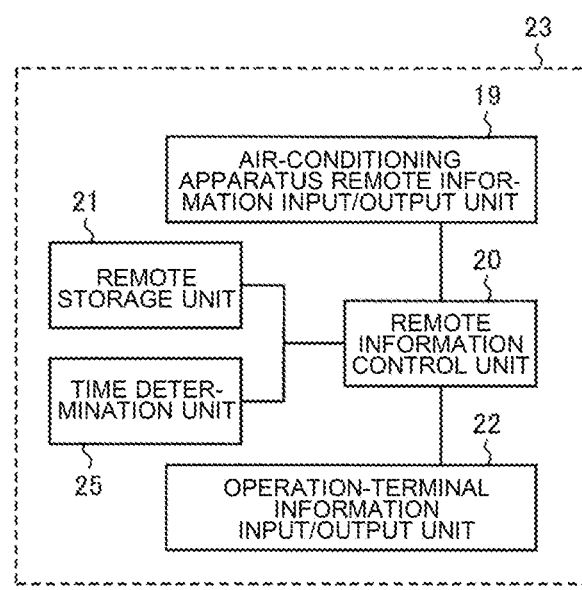
FIG. 12 is a function block diagram illustrating a modification of a controller 23 of a remote-operation centralized control apparatus of the air-conditioning-apparatus system according to Embodiment 3.

FIG. 12 is a function block diagram illustrating a modification of the controller 23 of the remote-operation centralized control apparatus 8 of the air-conditioning-apparatus system according to Embodiment 3. In FIG. 12, components that are the same as in FIG. 3 are denoted by the same reference signs, and the following description is made with respect to components in FIG. 12 that are different from the components in FIG. 3.

As illustrated in FIG. 12, a time determination unit 25 is provided in the remote-operation centralized control apparatus 8. The remote information control unit 20 stores, in the remote operation storage unit 21, time information on time at which last temperature information is acquired from the air-conditioning apparatus 1, and which is determined by the time determination unit 25, The operation terminal 9 may display a thermal image and the time information stored in the remote operation storage unit 21.

Therefore, in the air-conditioning-apparatus system according to Embodiment 3, it is possible to obtain an advantage of accurately notifying the user of the time at which thermal image information is formed, even in the case where it requires a long time to form a single thermal image, in addition to the advantages of the air-conditioning-apparatus systems of Embodiments 1 and 2.

Embodiment 4

Regarding Embodiments 1 to 3, it is described above how acquired temperature information is displayed as a thermal image. However, in a thermal image displayed in a high resolution, in some cases, the state of a room and the profile of a person are displayed in detail, and it is therefore necessary to pay attention to the protection of privacy. An air-conditioning-apparatus system according to Embodiment 4 enables the user to determine whether acquisition of temperature information is necessary or not and whether temperature information can be acquired or not.

Figure 13:
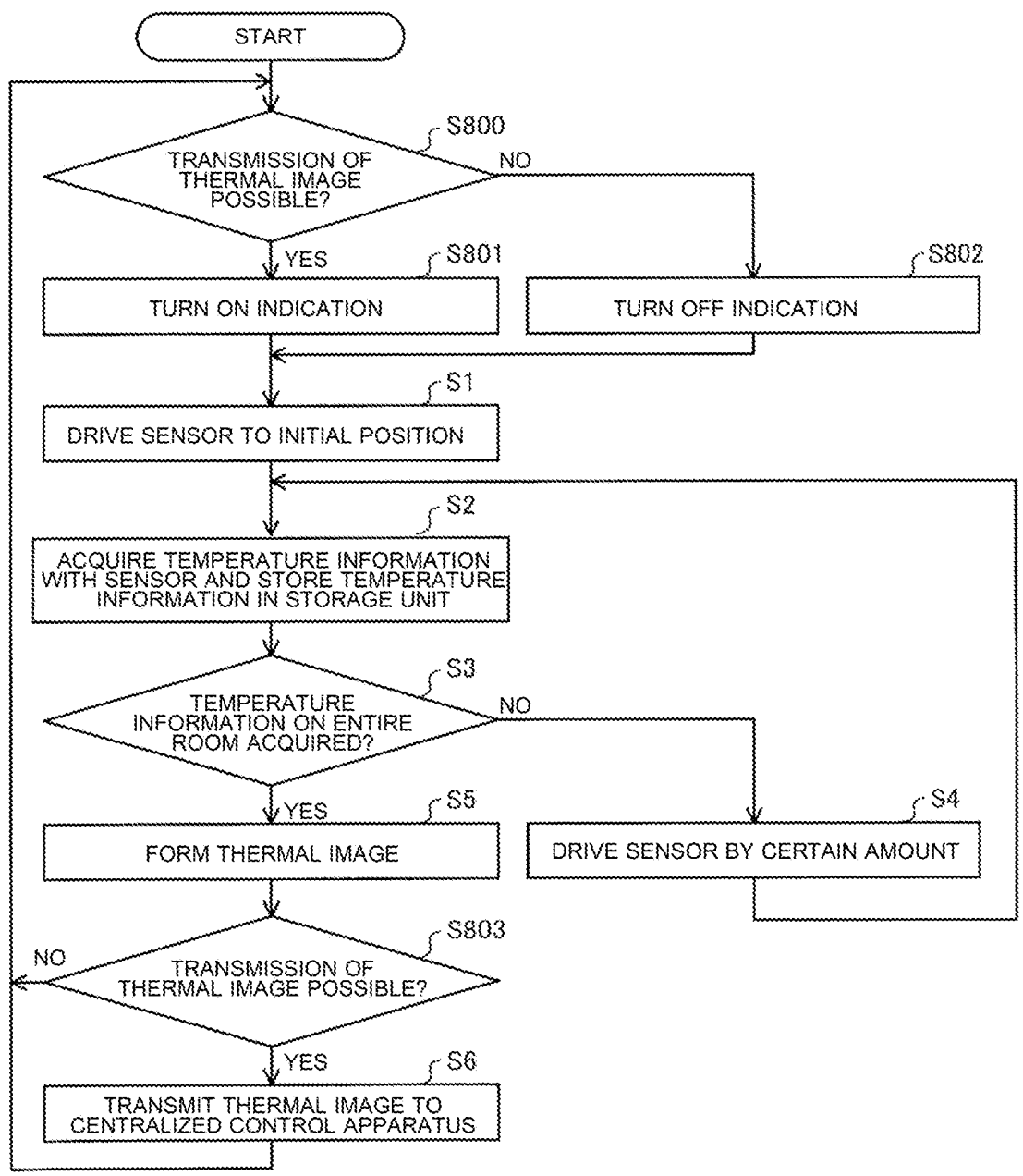
FIG. 13 is a flowchart indicating an operation of an air-conditioning-apparatus system according to Embodiment 4.

FIG. 13 is a flowchart indicating an operation of the air-conditioning-apparatus system according to Embodiment 4, Regarding Embodiment 4, components that are the same as those in Embodiment 1 will be denoted by the same reference sings, and their descriptions will be omitted, Embodiment 4 will be described by referring mainly to the differences between Embodiments 1 and 4.

First, the air-conditioning-apparatus indoor control unit 14 confirms whether a thermal image can be transmitted or not (S800). For example, to determine whether the thermal image can be transmitted, the remote control device 5 is additionally given in advance a function of setting whether to acquire a thermal image and transmit the thermal image to the remote-operation centralized control apparatus 8.

The remote control device 5 transmits to the air-conditioning apparatus 1, thermal-image transmission possibility/impossibility information indicating whether a thermal image formed by the thermal image forming unit 14-2 can be transmitted to the remote-operation centralized control apparatus 8 or not. The air-conditioning-apparatus storage unit 15 of the air-conditioning apparatus 1 stores the thermal-image transmission possibility/impossibility information transmitted from the remote control device 5. The air-conditioning-apparatus indoor control unit 14 determines whether the thermal image can be transmitted or not based on the thermal-image transmission possibility/impossibility information stored in the air-conditioning-apparatus storage unit 15.

When the thermal image can be transmitted in step S800 (YES in S800), the air-conditioning-apparatus indoor control unit 14 turns on the lamp in the display portion 4 of the air-conditioning apparatus 1, which indicates that a thermal image is in a transmissible state (S801). Therefore, the user can understand that the thermal image is in a transmissible state.

In step S800, when the thermal image cannot be transmitted (NO in S800), the lamp in the display portion 4, which indicates that a thermal image is in a transmissible state, is turned off (S802).

After the process of step S801 or S802, the processing proceeds to the process of step S1. The processes of steps S1 to 35 are the same as in Embodiment 1. After a thermal image is formed in step S5, the air-conditioning-apparatus indoor control unit 14 determines whether the thermal image can be transmitted (S803).

As in step S800, in step S803, it is determined whether the thermal image can be transmitted or not, based on the thermal-image transmission possibility/impossibility information stored in the air-conditioning-apparatus storage unit 15.

When the thermal-image transmission possibility/impossibility information is set to allow the thermal image to be transmitted (YES in S803), the air-conditioning-apparatus indoor control unit 14 transmits the thermal image to the remote-operation centralized control apparatus 8 via the adaptor 3 (S6).

By contrast, when the thermal-image transmission possibility/impossibility information is set not to allow the thermal image to be transmitted (NO in S803), the air-conditioning-apparatus indoor control unit 14 does not transmit the thermal image to the remote-operation centralized control apparatus 8, and the processing returns to the first step S800 in order to acquire subsequent temperature information.

In Embodiment 4, whether the thermal image can be transmitted or not is set in the air-conditioning apparatus 1, using the remote control device 5. However, whether the thermal image can be transmitted or not may be set using the operation terminal 9, and thermal-image transmission possibility/impossibility information may be transmitted to the air-conditioning apparatus 1 via the remote-operation centralized control apparatus 8.

Therefore, in the air-conditioning-apparatus system according to Embodiment 4, the user can set whether the thermal image can be displayed or not, and grasp whether the thermal image is in a transmissible state or not, and can thus take into account the protection of privacy.

Embodiment 5

Regarding Embodiments 1 to 4, it is described above how acquired temperature information is displayed as a thermal image. Regarding an air-conditioning-apparatus system according to Embodiment 5, it will be described how an acquired thermal image is displayed on the operation terminal 9 in such a manner as to allow the user to more easily understand the thermal image.

A thermal image displays temperature information with color or color density. Therefore, when a temperature difference between an object and the surrounding of the object is small, it is difficult to recognize the object in the thermal image. The air-conditioning-apparatus system according to Embodiment 5 enables the user to accurately recognize the object even in the above case.

Figure 14:
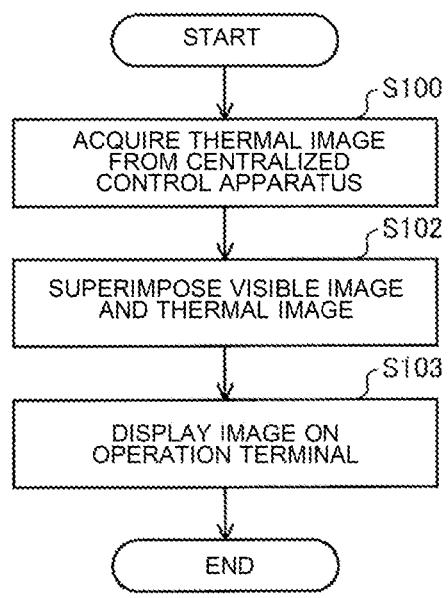
FIG. 14 is a flowchart indicating an operation of an operation terminal of an air-conditioning-apparatus system according to Embodiment 5.

FIG. 14 is a flowchart indicating an operation of the operation terminal 9 of the air-conditioning-apparatus system according to Embodiment 5. Regarding Embodiment 5, components that are the same as those in Embodiment 1 will be denoted by the same reference signs, and their descriptions will thus be omitted. Embodiment 5 will be described by referring mainly to the differences between Embodiments 1 and 5.

When the operation to acquire a thermal image is performed, the operation terminal 9 acquires the thermal image stored in the remote operation storage unit 21 via the internet network 10 (S100). In the case where a plurality of thermal images are stored in the remote operation storage unit 21, the operation terminal 9 may also acquire a thermal image by selecting one of the plurality of thermal images stored in the remote operation storage unit 21.

Next, a process of superimposing one of a visible image and the thermal image acquired in step S100 on the other is performed (S102). The visible image is, for example, a visible image of a room for which a thermal image stored in advance in the operation terminal 9 has been acquired, that is, the visible image is, for example, an image captured by a camera. It is not indispensable to store a visible image in advance before a thermal image is acquired. For example, a visible image may be captured by a camera after acquisition of a thermal image using an application that displays the thermal image on the operation terminal 9. In a given image superimposition method, one of a thermal image and a visible image is superimposed as a transparent image on the other. One of the thermal image and another image other than the thermal image stored in the operation terminal 9 may be superimposed on the other.

Figure 15:
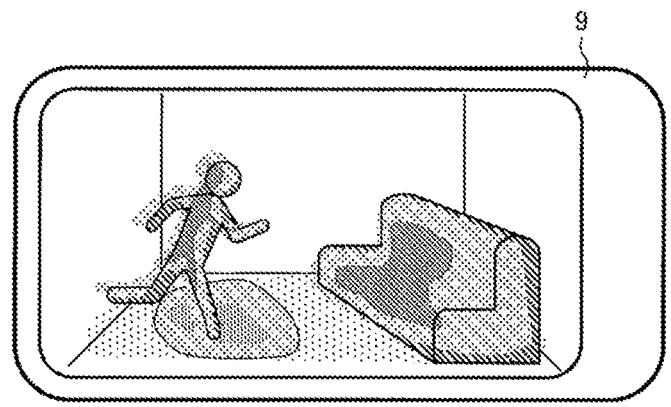
FIG. 15 illustrates an image displayed on the operation terminal of the air-conditioning-apparatus system according to Embodiment 5.

Lastly, the images one of which is superimposed on the other in step S103 are displayed (S103). FIG. 15 illustrates images displayed on the operation terminal 9 of the air-conditioning-apparatus system according to Embodiment 5. To be more specific, a thermal image is processed to obtain a transparent thermal image, and then superimposed on a visible image as illustrated in FIG. 15. Since the thermal image is combined with the visible image as illustrated in FIG. 15, the object can be more easily recognized, as compared with the case where only the thermal image is displayed as illustrated in FIG. 11.

Although a description concerning a way of acquiring a visible image is omitted in the flowchart, it is preferable that a thermal image be acquired at the time of acquiring a visible image. By describing a position where the operation terminal is provided, in the vicinity of the infrared sensor 2 of the air-conditioning apparatus 1 or by providing a structure that can fix the operation terminal, the angle of view for a thermal image that is acquired by the infrared sensor 2 can be easily made coincident with the angle of view for a visible image that is acquired by the operation terminal 9.

In the air-conditioning-apparatus system according to Embodiment 5, it is possible to obtain an advantage in which since one of a visible image and a thermal image is superimposed on the other, it is possible to correctly recognize an object even from a thermal image that is displayed with a small temperature difference, in addition to obtaining the advantageous effects of the air-conditioning-apparatus system of Embodiment 1.

Embodiment 6

In Embodiments 1 to 5, a single thermal image is formed based on a combination of plurality of temperature information on respective locations, and is displayed on the operation terminal. In such a method, although a wide-angle thermal image can be displayed, but it takes a long time to form the image.

In an air-conditioning-apparatus system according to Embodiment 6, one of a thermal image acquired in a narrow range and a thermal image acquired in a wide range can be selected. To be more specific, in the air-conditioning-apparatus system according to Embodiment 6, it is possible to select one of thermal images that are acquired in the following manners: the infrared sensor 2 is fixed, and thus acquires a thermal image in a narrow range, and the thermal image to be displayed can be updated in a short time period; and the infrared sensor 2 is moved to acquire a thermal image in a wide range, and it takes a long time to acquire the thermal image.

Figure 16:
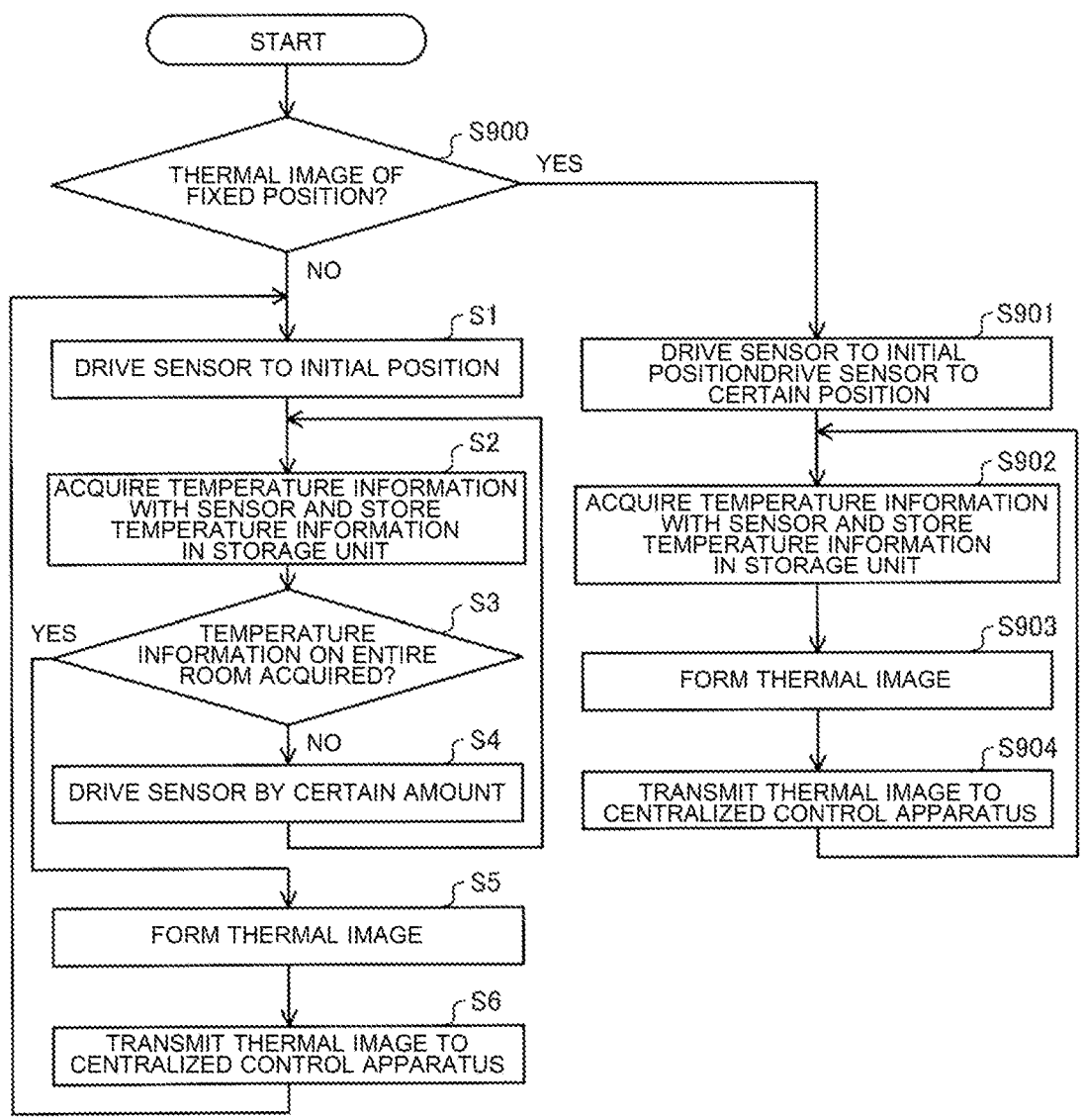
FIG. 16 is a flowchart indicating an operation of an air-conditioning-apparatus system according to Embodiment 6.

FIG. 16 is a flowchart indicating an operation of the air-conditioning-apparatus system according to Embodiment 6. Regarding Embodiment 6, components that are the same as those in Embodiment 1 will be denoted by the same reference sings, and their descriptions will thus be omitted. Embodiment 6 will be described by referring mainly to the differences between Embodiments 1 and 6.

First, a thermal-image acquisition mode is determined. This acquisition mode indicates whether to form a thermal image of a fixed position in the room 7 or a thermal image of the entire room 7. In order to set the thermal image acquisition mode, in a given method, the remote control device 5 is given in advance a function of setting the thermal image acquisition mode, and information on the setting is transmitted to the air-conditioning apparatus 1 and stored in in the air-conditioning-apparatus storage unit 15; and in another method, the thermal image acquisition mode is set with the operation terminal 9, and information is transmitted to the air-conditioning apparatus 1 via the remote-operation centralized control apparatus 8 to set the thermal image acquisition mode.

Based on the acquisition mode the setting of which is stored in the air-conditioning-apparatus storage unit 15, the air-conditioning-apparatus indoor control unit 14 determines whether to form a thermal image of a fixed position in the room 7 or a thermal image of the entire room 7 (S900).

When formation of a thermal image of the entire room 7 is selected as the setting of the thermal image acquisition mode in step S900 (NO in S900), the air-conditioning-apparatus indoor control unit 14 carries out steps S1 to S6, which are described regarding Embodiment 1.

When formation of a thermal image of the fixed position is selected as the setting of the thermal image acquisition mode in step S900 (YES in S900), the air-conditioning-apparatus indoor control unit 14 drives and moves the infrared sensor 2 to the fixed position, at which temperature information is to be acquired (S901).

Figure 17:
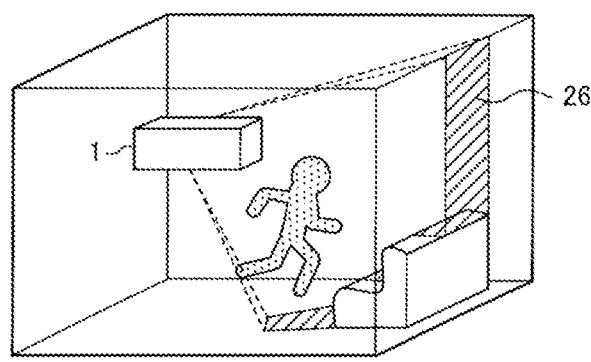
FIG. 17 is an explanatory view for light distribution, at a fixed position, by an infrared sensor of the air-conditioning-apparatus system according to Embodiment 6.

FIG. 17 is an explanatory view for light distribution, at the fixed position, by the infrared sensor 2 of the air-conditioning-apparatus system according to Embodiment 6. FIG. 17 illustrates the case where temperature information is acquired, with the infrared sensor 2 fixed for a location where a sofa is provided. It should be noted that the user may operate the remote control device 5 or other terminals to adjust the light distribution range of the infrared sensor 2.

Next, the air-conditioning-apparatus indoor control unit 14 acquires temperature information from the infrared sensor 2 (S902). The air-conditioning-apparatus indoor control unit 14 stores the acquired temperature information in the air-conditioning-apparatus storage unit 15. Then, the air-conditioning-apparatus indoor control unit 14 forms a thermal image based on the temperature information on the fixed position that is stored in the remote operation storage unit 21 (S903).

Next, the air-conditioning-apparatus indoor control unit 14 transmits the thermal image formed in step S903 to the remote-operation centralized control apparatus 8 via the internet network 10 (S904). Thereafter, the acquisition of temperature by the infrared sensor 2 in step S902, the formation of a thermal image in step S903, and the transmission of the thermal image in step S904 are repeatedly performed.

Therefore, in the air-conditioning-apparatus system according to Embodiment 6, it is possible to obtain an advantage in which the user can acquire an image of a narrow range that is to be updated in a short time period, in addition to the advantages obtained by the air-conditioning-apparatus system of Embodiment 1.

The above embodiments are described above by way of example, and the descriptions do not intend to limit the scope of the embodiments. The embodiments can be modified and provide various configurations, and various omissions, replacements, and changes may be made thereto without departing from the gist of the embodiments. The embodiments to which the omissions, replacements or changes are made and modifications of the embodiments are also covered in the scope and the gist of the embodiments.

REFERENCE SIGNS LIST

1: air-conditioning apparatus, 2: infrared sensor, 2a: drive actuator, 3: adaptor, 4: display portion, 5: remote control device, 6: router, 7: room, 8: remote-operation centralized control apparatus, 9: operation terminal, 10: internet network, 11: external network, 12: controller, 13: input unit, 14: air-conditioning-apparatus indoor control unit, 14-1: drive control unit, 14-2: thermal image forming unit, 15: air-conditioning-apparatus storage unit, 16: output unit, 17: remote information input/output unit, 19: air-conditioning-apparatus remote information input/output unit, 20: remote information control unit, 21: remote operation storage unit, 22: operation-terminal information input/output unit, 23: controller, 24: time determination unit, 25: time determination unit, 26: light distribution range

The invention claimed is:

1. An air-conditioning-apparatus system comprising:
an air-conditioning apparatus including an infrared sensor and a drive control unit, the infrared sensor being capable of acquiring temperature information on a location of one part of a room, the drive control unit being configured to control the infrared sensor to acquire the temperature information on a plurality of locations in the room; and
a remote-operation centralized control apparatus connected with the air-conditioning apparatus via a network,
wherein the air-conditioning apparatus includes
a memory configured to store the temperature information on the plurality of locations in the room that is acquired by the infrared sensor under the control by the drive control unit,
processing circuit configured to form a thermal image of the room based on the temperature information on the plurality of locations in the room that is stored in the memory, and
a display configured to indicate that the thermal image formed by the processing circuit is in a transmissible state, when the thermal image is transmissible,
wherein
the memory is configured to store time information indicating time at which the thermal image is formed by the processing circuit, and
a transmitter of the air-conditioning apparatus is configured to transmit, along with the thermal image, time information acquired last of the time information stored in the memory and indicating the time at which the thermal image is formed or the temperature information on the plurality of locations in the room that is stored in the memory.

2. The air-conditioning-apparatus system of claim 1, wherein the air-conditioning apparatus includes
a transmitter configured to transmit the thermal image formed by the processing circuit to the remote-operation centralized control apparatus via the network.

3. The air-conditioning-apparatus system of claim 1, further comprising an operation terminal configured to operate the air-conditioning apparatus,
wherein the operation terminal is configured to display the thermal image transmitted from the transmitter of the remote-operation centralized control apparatus and a visible image of the room or an image different from the thermal image such that one of the thermal image and the visible image or the image different from the thermal image is superimposed on the other.

4. The air-conditioning-apparatus system of claim 3, wherein the air-conditioning apparatus further includes an indication or a structure, the indication indicating a position of the operation terminal or the structure fixing the operation terminal, when the visible image is acquired by the operation terminal.

5. The air-conditioning-apparatus system of claim 1, wherein the memory is configured to store as data, an acquisition mode indicating whether to form a thermal image of a fixed position in the room or a thermal image of the whole of the room, and
the processing circuit is configured to form the thermal image of the fixed position in the room based on temperature information on the fixed position in the room that is stored in the memory, when the acquisition mode the data on which is stored in the memory indicates that the thermal image of the fixed position in the room is to be formed;
and form the thermal image of the entire room based on the temperature information on the entire room that is stored in the memory, when the acquisition mode the data on which is stored in the memory indicates that the thermal image of the entire room is to be formed.

6. An air-conditioning-apparatus system comprising:
an air-conditioning apparatus including an infrared sensor and a drive control unit, the infrared sensor being capable of acquiring temperature information on a location of one part of a room, the drive control unit being configured to control the infrared sensor to acquire the temperature information on a plurality of locations in the room; and
a remote-operation centralized control apparatus connected with the air-conditioning apparatus via a network,
wherein the air-conditioning apparatus includes
a memory configured to store the temperature information on the plurality of locations in the room that is acquired by the infrared sensor under the control by the drive control unit,
processing circuit configured to form a thermal image of the room based on the temperature information on the plurality of locations in the room that is stored in the memory,
a display configured to indicate that the thermal image formed by the processing circuit is in a transmissible state, when the thermal image is transmissible, and
a transmitter configured to transmit the thermal image formed by the processing circuit to the remote-operation centralized control apparatus via the network, wherein
the memory is configured to store thermal-image transmission possibility/impossibility information indicating whether the thermal image formed by the processing circuit is transmissible to the remote-operation centralized control apparatus or not, and
the transmitter of the air-conditioning apparatus is configured to transmit the thermal image formed by the processing circuit to the remote-operation centralized control apparatus, only when the thermal-image transmission possibility/impossibility information stored in the memory indicates that the thermal image is transmissible to the remote-operation centralized control apparatus.

7. The air-conditioning-apparatus system of claim 6, further comprising an operation terminal configured to operate the air-conditioning apparatus,
   wherein the operation terminal is configured to display the thermal image transmitted from the transmitter of the remote-operation centralized control apparatus and a visible image of the room or an image different from the thermal image such that one of the thermal image and the visible image or the image different from the thermal image is superimposed on the other.

8. The air-conditioning-apparatus system of claim 7, wherein the air-conditioning apparatus further includes an indication or a structure, the indication indicating a position of the operation terminal or the structure fixing the operation terminal, when the visible image is acquired by the operation terminal.

9. The air-conditioning-apparatus system of claim 6, wherein
   the memory is configured to store as data, an acquisition mode indicating whether to form a thermal image of a fixed position in the room or a thermal image of the whole of the room, and
   the processing circuit is configured to form the thermal image of the fixed position in the room based on temperature information on the fixed position in the room that is stored in the memory, when the acquisition mode the data on which is stored in the memory indicates that the thermal image of the fixed position in the room is to be formed; and form the thermal image of the entire room based on the temperature information on the entire room that is stored in the memory, when the acquisition mode the data on which is stored in the memory indicates that the thermal image of the entire room is to be formed.

* * * * *